(12) United States Patent
Yamada et al.

(10) Patent No.: US 10,843,890 B2
(45) Date of Patent: Nov. 24, 2020

(54) TRAY DEVICE WITH REDUCED COLLISION SOUND

(71) Applicant: PFU LIMITED, Kahoku (JP)

(72) Inventors: Eiki Yamada, Kahoku (JP); Masaya Takamori, Kahoku (JP)

(73) Assignee: PFU LIMITED, Kahoku (JP)

( * ) Notice: Subject to any disclaimer, the term of this patent is extended or adjusted under 35 U.S.C. 154(b) by 0 days.

(21) Appl. No.: 16/201,797

(22) Filed: Nov. 27, 2018

(65) Prior Publication Data

US 2019/0270608 A1    Sep. 5, 2019

(30) Foreign Application Priority Data

Mar. 2, 2018 (JP) .................................. 2018-037443

(51) Int. Cl.
*B65H 31/00* (2006.01)
*B41J 11/58* (2006.01)
(Continued)

(52) U.S. Cl.
CPC .............. *B65H 31/00* (2013.01); *B41J 11/58* (2013.01); *B65H 31/02* (2013.01); *B65H 31/20* (2013.01); *G03G 15/602* (2013.01); *G03G 15/6514* (2013.01); *G03G 15/6552* (2013.01); *H04N 1/00* (2013.01); *B65H 2301/4212* (2013.01); *B65H 2402/32* (2013.01); *B65H 2402/343* (2013.01); *B65H 2402/46* (2013.01); *B65H 2405/1114* (2013.01);

(Continued)

(58) Field of Classification Search
CPC ........ B65H 31/20; B65H 31/02; B65H 31/00; B65H 1/04; B65H 1/266; B41J 11/58; B65D 1/34; B65D 11/12; B65D 5/38; A47G 23/06

See application file for complete search history.

(56) References Cited

U.S. PATENT DOCUMENTS 4,564,118 A * 1/1986 Heyer .................... F25D 25/021
  220/8
9,855,771 B2 * 1/2018 Sugiyama ................ B41J 11/58
(Continued)

FOREIGN PATENT DOCUMENTS

JP         2013-1528 A      1/2013
WO    WO 2016/111073 A1    7/2016

*Primary Examiner* — Thomas A Morrison
(74) *Attorney, Agent, or Firm* — Lewis Roca Rothgerber Christie LLP (57) ABSTRACT

A tray device includes a first tray including a first surface and an abutting portion, and a second tray including a second surface and an abutted portion. The second tray is configured to move with respect to the first tray. The abutting portion includes two abutting surfaces located obliquely with respect to an extending direction of the first surface. The abutted portion includes two abutted surfaces located obliquely with respect to an extending direction of the second surface. A difference between an angle formed by each of the two abutting surfaces and the extending direction of the first surface and an angle formed by each of the two abutted surfaces and the extending direction of the second surface is set larger than a maximum angular difference between the extending direction of the first surface and a movement direction in which the second tray moves with respect to the first tray.

3 Claims, 9 Drawing Sheets

(51) Int. Cl.
*G03G 15/00* (2006.01)
*B65H 31/20* (2006.01)
*H04N 1/00* (2006.01)
*B65H 31/02* (2006.01)

(52) U.S. Cl.
CPC ............... *B65H 2405/11164* (2013.01); *B65H 2405/324* (2013.01); *B65H 2601/521* (2013.01); *B65H 2801/12* (2013.01); *B65H 2801/39* (2013.01)

(56) References Cited

U.S. PATENT DOCUMENTS

2017/0174464 A1   6/2017  Tanaka et al.
2017/0217222 A1*  8/2017  Sugiyama ........... G03G 15/6552
2017/0283195 A1* 10/2017  Ikegami ................ B65H 1/266

* cited by examiner

TRAY DEVICE WITH REDUCED COLLISION SOUND

CROSS-REFERENCE TO RELATED APPLICATIONS

This application is based upon and claims the benefit of priority of prior Japanese Patent Application No. 2018-037443, filed on Mar. 2, 2018, the entire contents of which are incorporated herein by reference.

FIELD OF THE INVENTION

The present invention relates to a tray device.

BACKGROUND

Figure 1A:
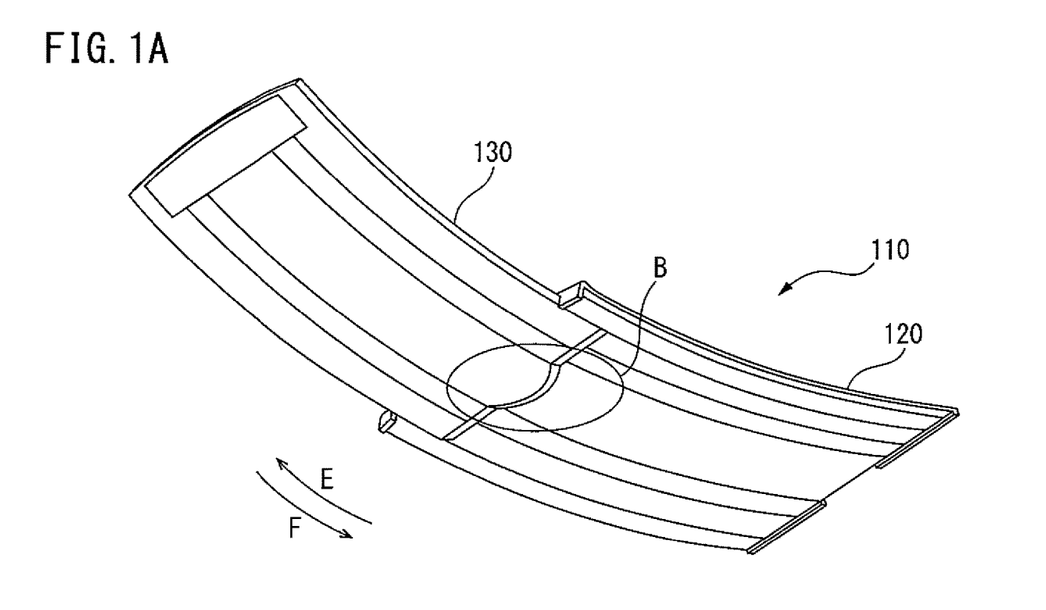
FIG. 1A is a perspective view illustrating a conventional tray device to be mounted on a scanner.
Figure 1B:
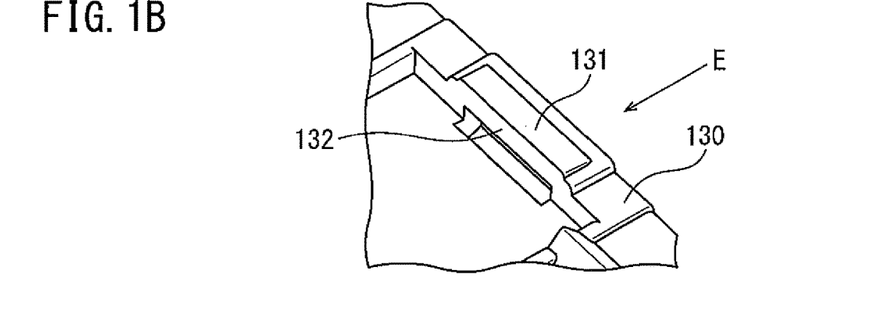
FIG. 1B is a perspective view illustrating a locking portion provided on a second tray.
Figure 1C:
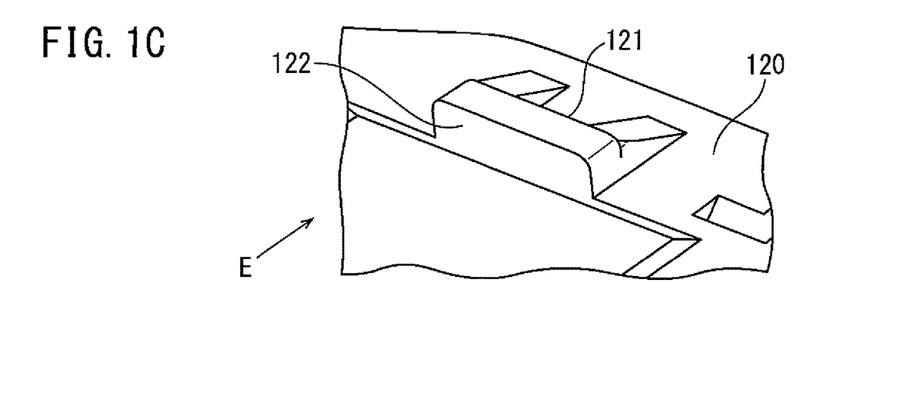
FIG. 1C is a perspective view illustrating a locked portion which is provided on the back surface of a first tray illustrated in FIG. 1A and against which the locking portion collides when the second tray is pulled out.

Tray devices mounted on, e.g., a scanner and a printer include a plurality of trays which are compactly accommodated when not in use and are pulled out to be more widely expanded when in use (see, e.g., International Publication WO 2016/111073 and Japanese Unexamined Patent Publication (Kokai) No. 2013-1528). However, when expanding a pull-out tray device, a collision sound may occur upon collision between members for preventing removal of parts provided between members. FIGS. 1A to 1C illustrate a conventional tray device 110. The tray device 110 is expanded by pulling out a second tray 130 with respect to a first tray 120 in the direction indicated by an arrow E in FIGS. 1A to 1C by the user. A removal prevention mechanism is provided between the first tray 120 and the second tray 130 (a portion B illustrated in FIG. 1A) to prevent the user from removing the second tray 130 from the first tray 120. FIG. 1B illustrates a locking portion 131 for preventing removal of parts provided on the second tray 130. FIG. 1C illustrates a locked portion 121 for preventing removal of parts which is provided on the first tray 120 and locked to the locking portion 131. When the second tray 130 is pulled out, a locking surface 132 of the locking portion 131 collides against a locked surface 122 of the locked portion 121, thereby preventing removal of the second tray 130.

SUMMARY

The locked surface 122 of the first tray 120 and the locking surface 132 of the second tray 130 illustrated in FIGS. 1A to 1C are formed perpendicularly to the direction in which the second tray 130 is pulled out (the arrow E in FIGS. 1A to 1C). The force the user pulls out is directly transmitted from the locked surface 122 to the locking surface 132, thus generating a large collision sound.

In one aspect, it is an object to provide a tray device which produces reduced collision sound during tray movement.

In one aspect, there is provided a tray device mounted on an apparatus, for holding a document. The tray device includes a first tray including a first surface and an abutting portion, and a second tray including a second surface and an abutted portion. The second tray is configured to move with respect to the first tray. The abutting portion includes two abutting surfaces located obliquely with respect to an extending direction of the first surface in which the first surface extends from the apparatus. The abutted portion includes two abutted surfaces located obliquely with respect to an extending direction of the second surface in which the second surface extends from the first tray. When an angle formed by each of the two abutting surfaces and the extending direction of the first surface is defined as a first angle, an angle formed by each of the two abutted surfaces and the extending direction of the second surface is defined as a second angle and a maximum angular difference between the extending direction of the first surface and a movement direction in which the second tray moves with respect to the first tray is defined as a third angle, a difference between the first angle and the second angle is set larger than the third angle.

DESCRIPTION OF EMBODIMENTS

Hereinafter, a tray device according to an embodiment, will be described with reference to the drawings. However, it should be noted that the technical scope of the invention is not limited to these embodiments, and extends to the inventions described in the claims and their equivalents.

Figure 2A:
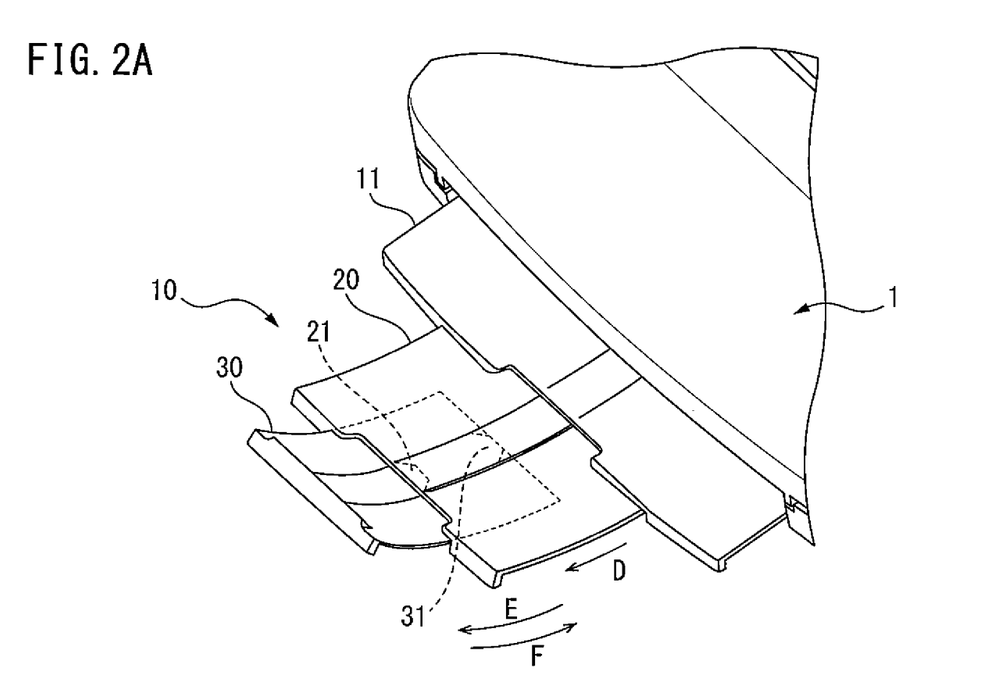
FIG. 2A is a view illustrating a tray being pulled out.
Figure 2B:
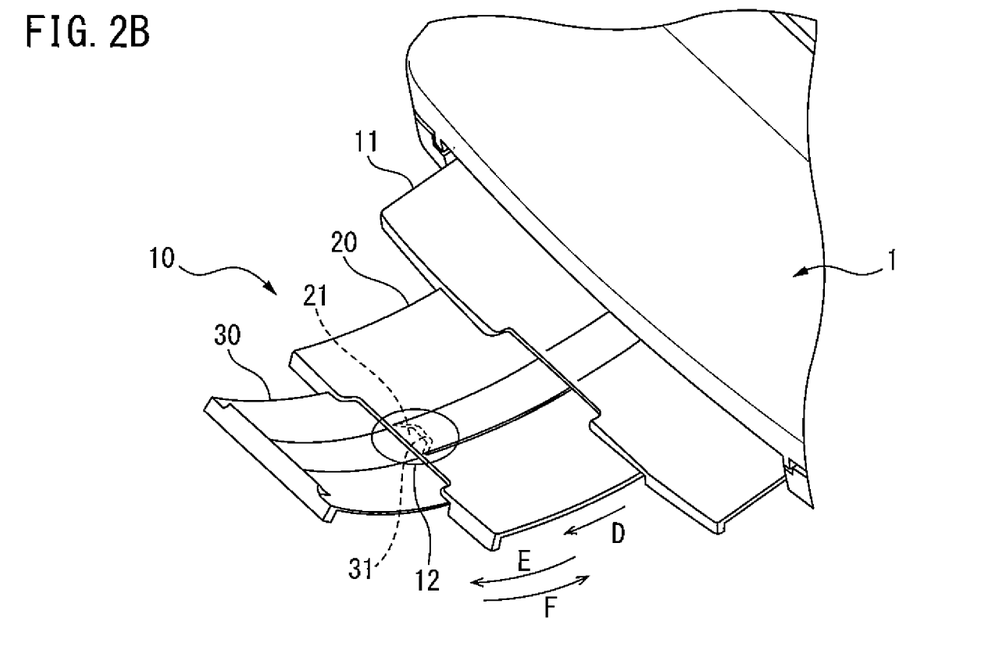
FIG. 2B is a view illustrating the tray completely pulled out.

FIGS. 2A and 2B are perspective views illustrating the sheet discharge portion of a scanner 1 equipped with a tray device 10 according to an embodiment of the present invention. The tray device 10 is mounted on a document transport apparatus such as a scanner 1 and holds a document discharged from the scanner 1, as illustrated in FIGS. 2A and 2B. The tray device 10 may be mounted on, e.g., a facsimile apparatus, an inkjet printer, a laser printer, or a MFP (Multifunction Peripheral). The tray device 10 may also be mounted on the sheet feed portion of a document transport apparatus and hold a document to be fed to the scanner 1.

Figure 3:
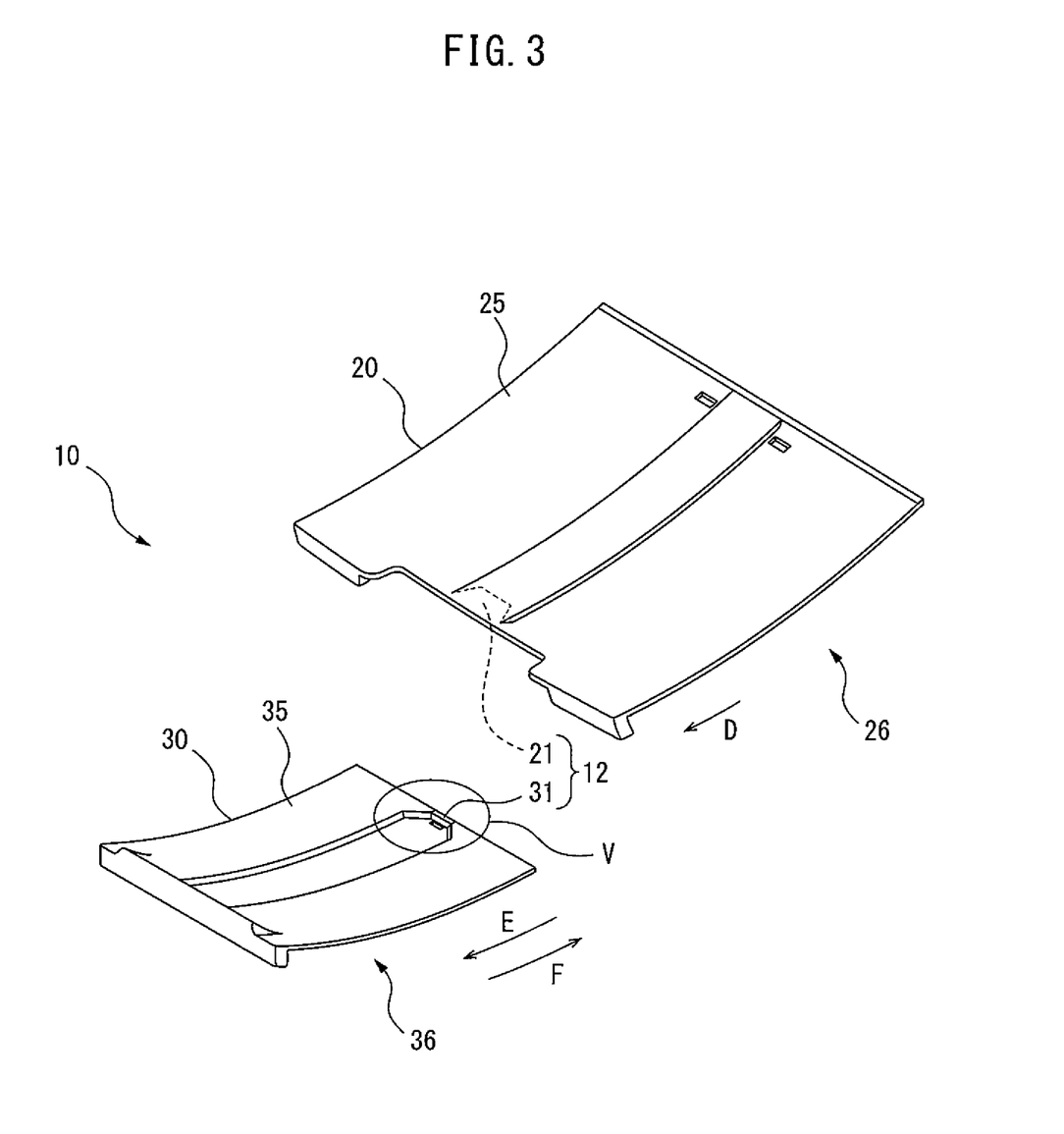
FIG. 3 is an exploded perspective view of the tray device.

The tray device 10 includes a base portion 11 extending from the outlet of the scanner 1, a first tray 20 mounted to be movable with respect to the base portion 11, and a second tray 30 mounted to be movable in the direction indicated by an arrow E or F with respect to the first tray 20. The first tray 20 is formed to extend in the extending direction of a front surface 25 in which the front surface 25 extends from the scanner 1 (the direction indicated by an arrow D in FIGS. 2A and 2B), for example, in the direction to discharge sheets from the outlet. The user can expand the tray device 10 by pulling out the second tray 30 in the direction indicated by the arrow E. As illustrated in FIG. 3, the first tray 20 includes a locked portion 21, a front surface 25 and a back surface 26. The front surface 25 of the first tray 20 is an example of a first surface, and the locked portion 21 is an example of an abutting portion. The second tray 30 includes a locking portion 31, a front surface 35 and a back surface 36, and is configured to move with respect to the first tray 20. The front surface 35 of the second tray 30 is an example of a second surface, and the locking portion 31 is an example of an abutted portion. A removal prevention mechanism 12 is provided between the first tray 20 and the second tray 30 of the tray device 10 to prevent the user from removing parts during expansion of the second tray 30 (see FIG. 3). The removal prevention mechanism 12 includes a locked portion 21 formed on the back surface 26 of the first tray 20, and a locking portion 31 which is formed on the front surface 35 of the second tray 30 and locked to the locked portion 21.

Figure 4A:
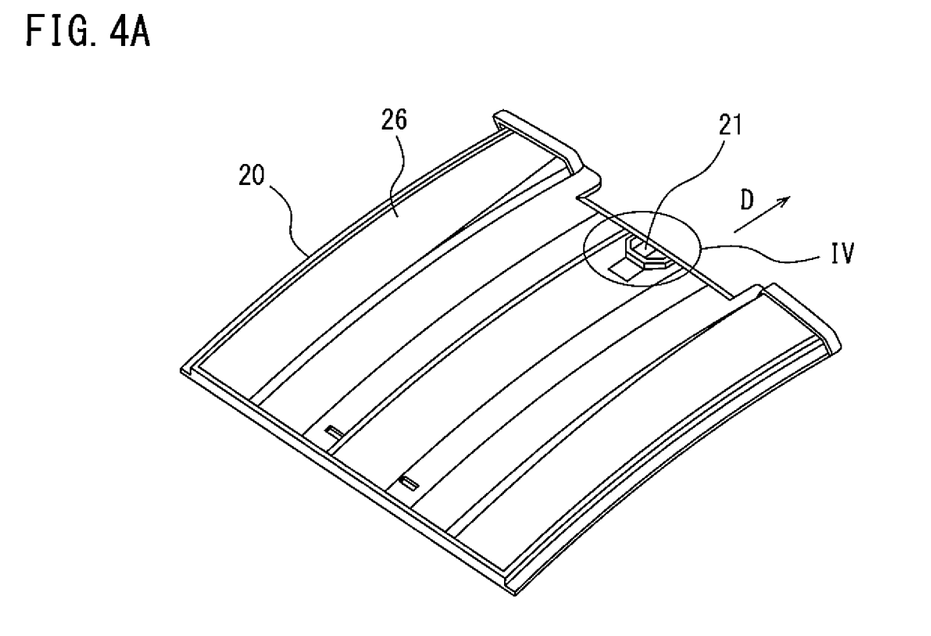
FIG. 4A is a perspective view illustrating the back surface of a first tray.
Figure 4B:
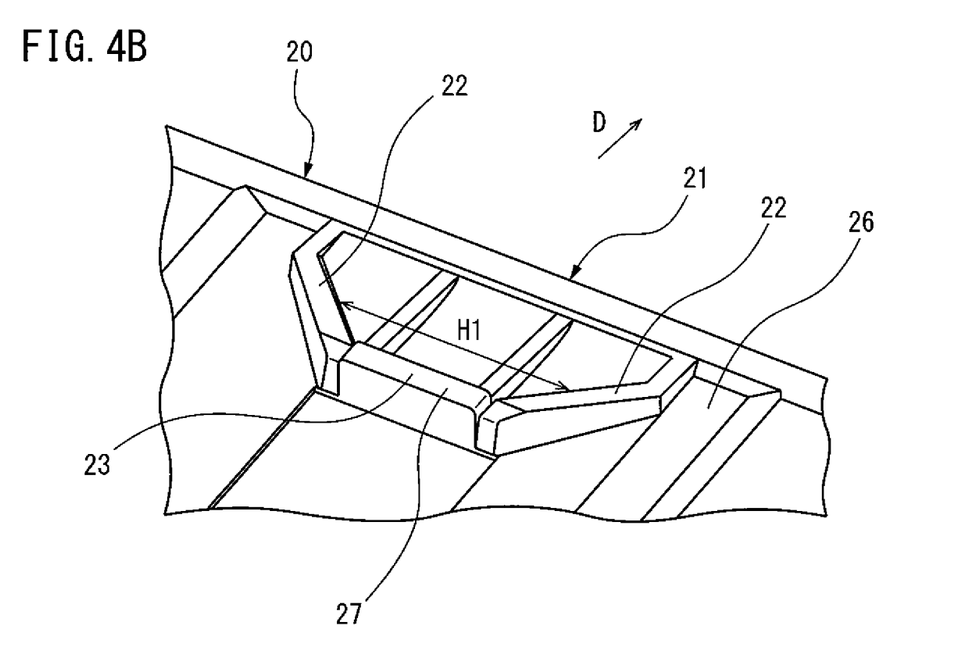
FIG. 4B is an enlarged view of portion IV of FIG. 4A illustrating a locked portion.

FIGS. 4A and 4B illustrate the locked portion 21 provided on the back surface 26 of the first tray 20. The locked portion 21 is provided on the front edge in the direction to pull out the second tray 30 (the direction indicated by the arrow E in any of the above drawings), as illustrated in FIG. 4A. The locked portion 21 includes two first inclined surfaces 22 and a second locked portion 23 for preventing removal of parts, as illustrated in FIG. 4B.

Each of the two first inclined surfaces 22 is one exemplary abutting surface located obliquely with respect to the extending direction of the front surface 25 in which the front surface 25 of the first tray 20 extends from the scanner 1. As illustrated in FIG. 2B, abutment of the locked portion 21 against the locking portion 31 forms a document holding surface which is the continuous surface of the front surface 25 of the first tray 20 and the front surface 35 of the second tray 30. In this embodiment, the extending direction of the front surface 25 of the first tray 20 is the longitudinal direction of the formed document holding surface. The movement direction in which the first tray 20 moves with respect to the scanner 1 has a margin (e.g., ±5°) with respect to the document transport direction for preventing damage by the movement with respect to the base portion 11. The extending direction of the front surface 25 of the first tray 20 is the direction in which the front surface 25 of the first tray 20 extends from the scanner 1 when the direction in which the first tray 20 moves is identical to the document transport direction of the scanner 1.

Each first inclined surface 22 is formed to extend with an inclination with respect to the extending direction of the front surface 25 of the first tray 20 and to gradually vary in width H1 between the first inclined surfaces 22 in the extending direction of the front surface 25 of the first tray 20. In the locked portion 21 illustrated in FIG. 4B, the width H1 between the first inclined surfaces 22 becomes larger along the extending direction of the front surface 25 of the first tray 20. In other words, the two first inclined surfaces 22 are formed on the surface (back surface 26) of the first tray 20 so that a direction in which one surface of the two first inclined surfaces 22 is inclined is opposite to a direction in which the other surface of the two first inclined surfaces 22 is inclined. The second locked portion 23 is provided between the first inclined surfaces 22 to be located more to the rear side than the first inclined surfaces 22 in the direction to pull out the second tray 30 (the direction indicated by the arrow E), i.e., movement direction of the second tray 30. The second locked portion 23 includes projection 27.

Figure 5:
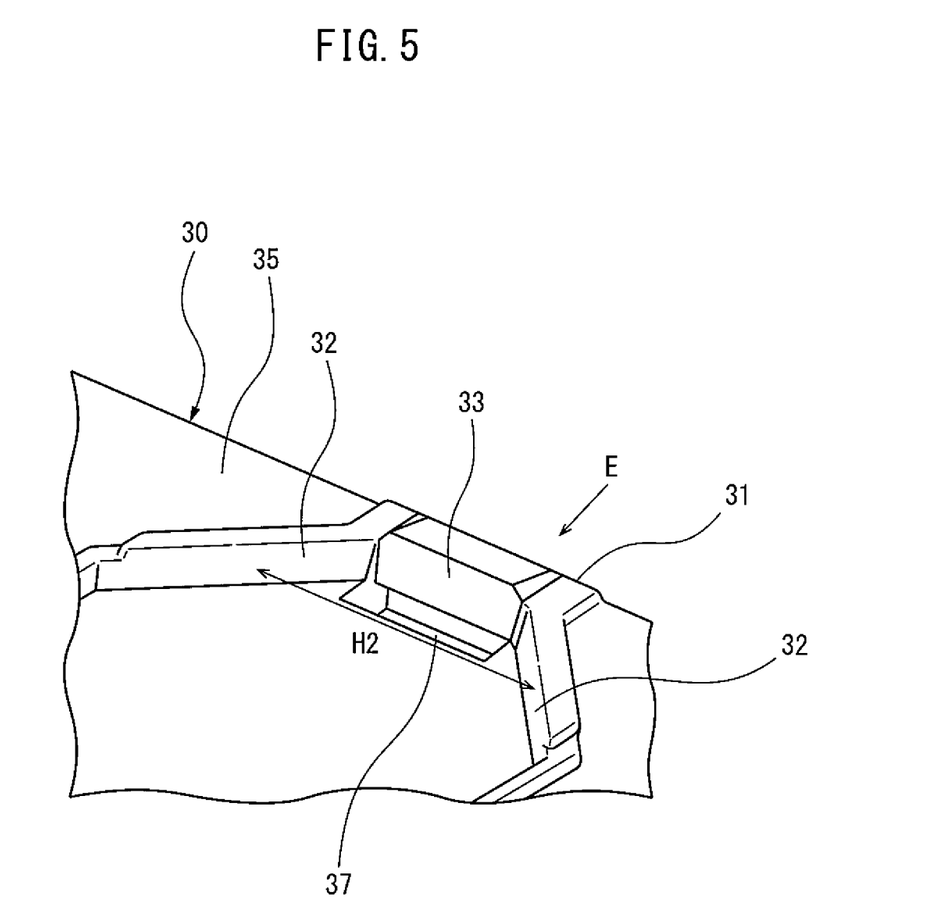
FIG. 5 is an enlarged view of portion V of FIG. 3 illustrating a locking portion of a second tray.

FIG. 5 illustrates the locking portion 31 provided on the front surface 35 of the second tray 30.

Each of the two second inclined surfaces 32 is one exemplary abutted surface located obliquely with respect to the extending direction of the front surface 35, in which the front surface 35 of the second tray 30 extends from the first tray 20. In this embodiment, the extending direction of the front surface 35 of the second tray 30 is the longitudinal direction of a document holding surface which is the continuous surface of the front surface 25 of the first tray 20 and the front surface 35 of the second tray 30. The movement direction in which the second tray 30 moves with respect to the first tray 20, i.e., the pullout direction to pull out the second tray 30 has a margin (e.g., ±5°) with respect to the document transport direction for preventing damage by the movement with respect to the first tray 20. The extending direction of the front surface 35 of the second tray 30 is the direction in which the front surface 35 of the second tray 30 extends from the first tray 20 when the direction in which the second tray 30 moves is identical to the extending direction of the first tray 20.

The locking portion 31 includes two second inclined surfaces 32 and a second locking portion 33, as illustrated in FIG. 5. Each of the two second inclined surfaces 32 is formed to extend with an inclination with respect to the direction to pull out the second tray 30 (the direction indicated by an arrow E in FIG. 5) and to gradually vary in width H2 between the second inclined surfaces 32 in the direction to pull out. On the two second inclined surfaces 32 of the locking portion 31 illustrated in FIG. 5, the width H2 between the second inclined surfaces 32 becomes larger along the direction to pull out (the direction indicated by the arrow E). In other words, the two second inclined surfaces 32 are formed on the front surface of the second tray 30 so that a direction in which one surface of the two second inclined surfaces 32 is inclined is opposite to a direction in which the other surface of the two second inclined surfaces 32 is inclined. The locked portion 21 abuts against the locking portion 31 so that the two first inclined surfaces 22 are included inside of the two second inclined surfaces 32. The second locking portion 33 is located more to the rear side than the second inclined surfaces in the direction to pull out the second tray 30 (the direction indicated by the arrow E). The second locking portion 33 includes a fitting portion 37 which fits with the projection 27. When the second tray 30 is moved with respect to the first tray 20, the second tray 30 is positioned with respect to the first tray 20 by fitting the projection 37 into the fitting portion 37.

Figure 6:
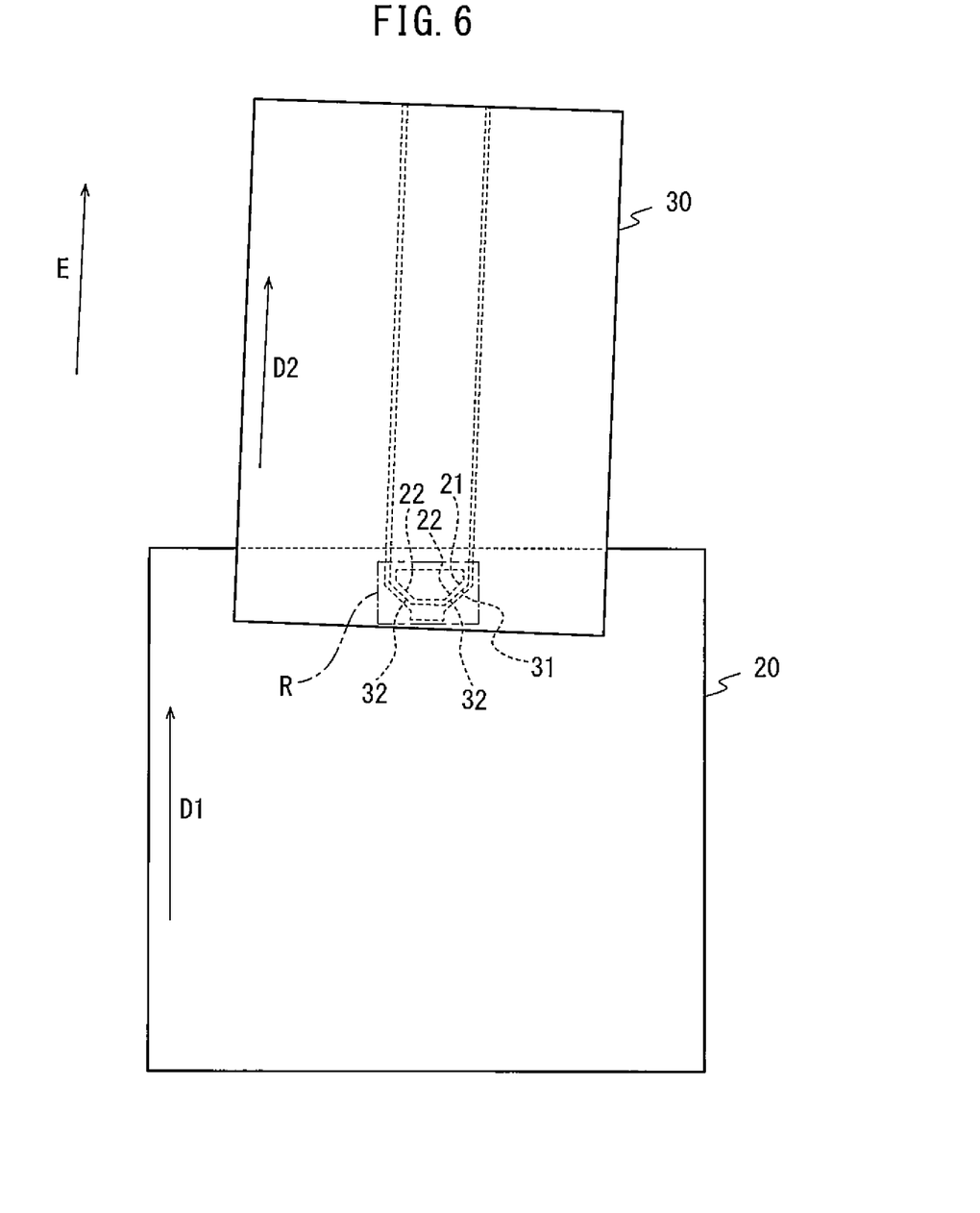
FIG. 6 is a schematic view illustrating the locking portion locked to the locked portion.
Figure 7:
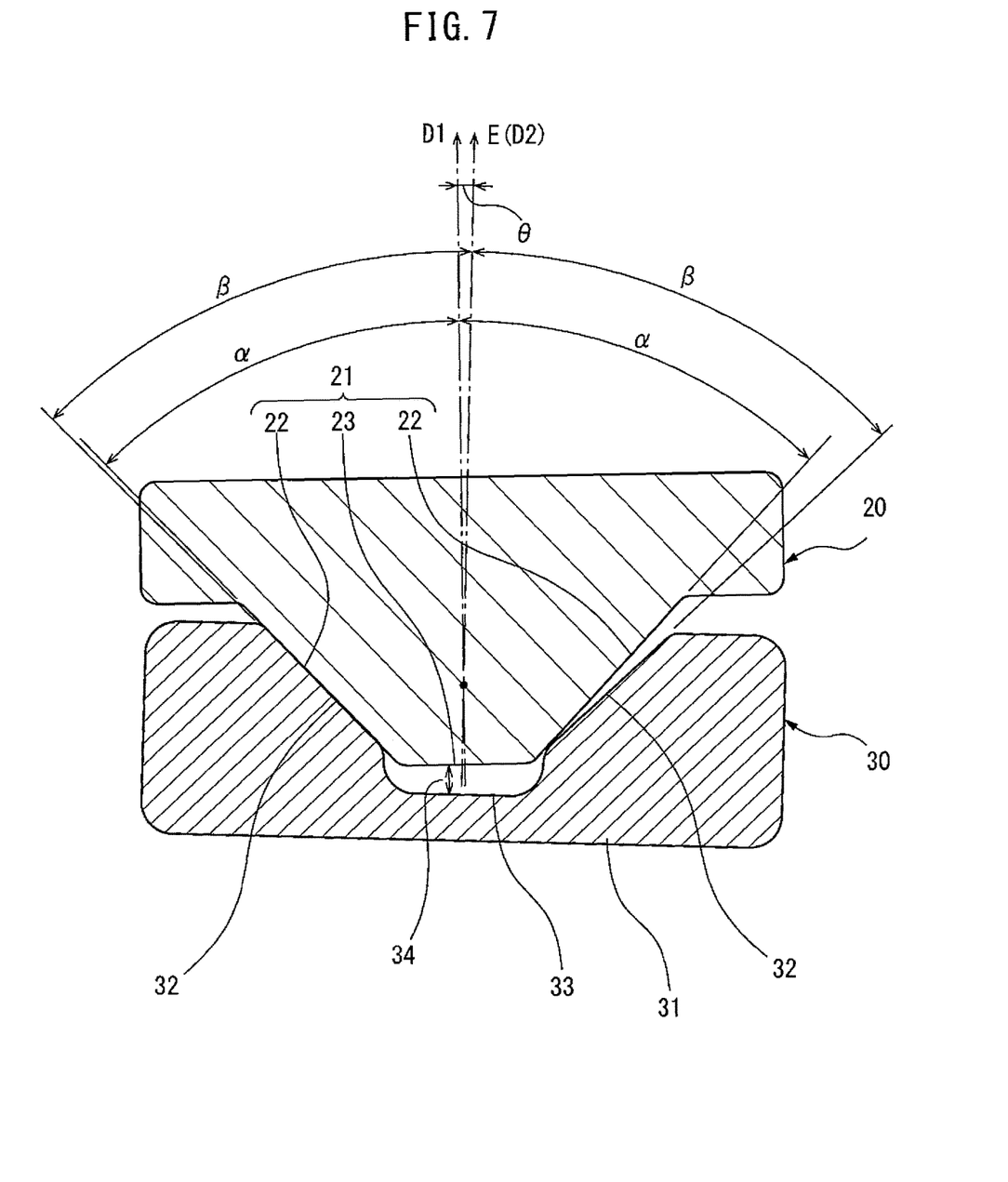
FIG. 7 is an enlarged view of a region R illustrated of FIG. 6.

FIG. 6 is a schematic view illustrating the state where the locking portion 31 of the second tray 30 has collided against (is locked to) the locked portion 21 of the first tray 20. FIG. 7 illustrates an enlarged view of a region R of FIG. 6. FIGS. 6 and 7 illustrate an example in which the movement direction E of the second tray 30 is inclined by an angle θ with respect to an extending direction D1 of the front surface 25 of the first tray 20. An extending direction D2 of the front surface 35 of the second tray 30 is identical to the movement direction E of the second tray 30, as illustrated in FIG. 6. As illustrated, a shape formed by each of the two first inclined surfaces 22 of the locked portion 21 in the extending direction D1 of the front surface 25 of the first tray 20 is different from that formed by each of the two second inclined surfaces 32 of the locking portion 31 in the extending direction D2 of the front surface 35 of the second tray 30. Therefore, when the locking portion 31 collides against the locked portion 21, the two first inclined surfaces 22 at least partially abut against the two second inclined surfaces 32.

More specifically, as illustrated in FIG. 7, a first angle α formed by each of the two first inclined surfaces 22 and the extending direction of the front surface 25 of the first tray 20 (the direction indicated by the arrow D1 in FIG. 7) is different from a second angle β formed by each of the two second inclined surfaces 32 and the extending direction of the front surface 35 of the second tray 30 (the direction indicated by the arrow D2 in FIG. 7). In particular, the first angle α is smaller than the second angle β. In other words, in the portion in which the locking portion 31 and the locked portion 21 collide against each other, the first inclined surfaces 22 are not parallel to the second inclined surfaces 32. Forming the locking portion 31 and the locked portion 21 in this way to at least partially abut against each other allows the locked portion 21 to collide against the locking portion 31 with a tilt so that the force from the user is not directly applied to the locked portion 21 but is dispersed. Energy is also expected to be dispersed by friction upon tilting of the second inclined surfaces 32 with respect to the first inclined surfaces 22. Such force dispersion can dampen an impact and produce reduced collision sound occurring upon collision.

Figure 8:
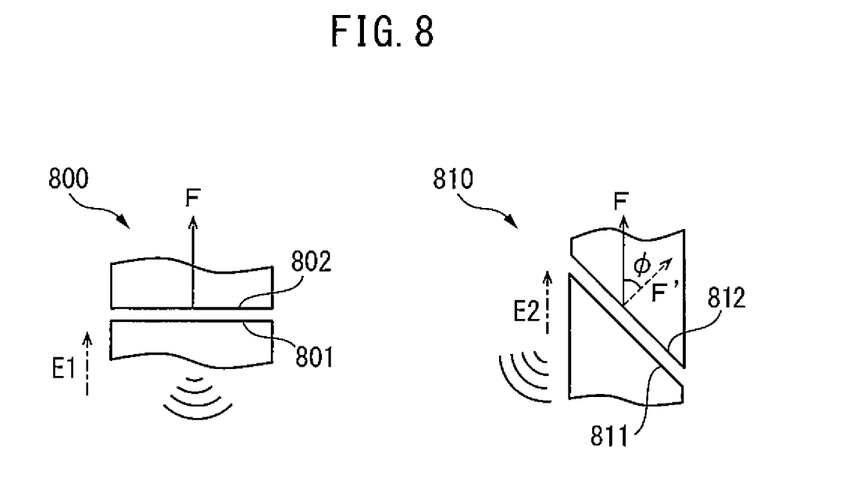
FIG. 8 is a schematic view for explaining the relationship between a collision angle and a sound occurring upon collision.

FIG. 8 is a schematic view for explaining the relationship between the angle at which two surfaces collide against each other and a sound occurring upon collision. As represented in an image 800 of FIG. 8, when one surface 801 moves in a direction E1 perpendicular to each of the surface 801 and the other surface 802 and collides against the other surface 802, a predetermined force F is applied to the other surface 802. As represented in an image 810 of FIG. 8, when one surface 811 moves in a direction E2 inclined by a predetermined angle ϕ with respect to a direction perpendicular to each of the surface 811 and the other surface 812 and collides against the other surface 812, a predetermined force F is applied to the other surface 812. The force F is given by the following equation:

$$F = F \cos \phi < F$$

A collision sound occurring upon collision is proportional to the force applied to the collided surfaces. Therefore, the collision sound occurring upon collision can be reduced by moving one given surface in a direction inclined with respect to the other surface and making the given surface collide against the other surface.

Referring to FIGS. 6 and 7, the extending direction D1 of the front surface 25 of the first tray 20 is nearly identical to the movement direction E of the second tray 30. However, a slight angular shift θ may occur between the extending direction D1 of the front surface 25 of the first tray 20 and the movement direction E of the second tray due to, e.g., manufacturing errors and slight plays set in assembling the second tray 30 onto the first tray 20. The maximum angular difference of the angular difference θ between the extending direction D1 and the movement direction E is defined as a third angle $\theta_{MAX}$. In consideration of the third angle $\theta_{MAX}$, the difference between the first angle α formed by the first inclined surface 22 and the extending direction D1 and the second angle β formed by the second inclined surface 32 and the movement direction E, i.e., the extending direction D2 of the front surface 35 of the second tray 30 is set so that respective parts abut against each other. For example, it is desirable to maintain the relationship represented by the following formula. In other words, the difference between the first angle α and the second angle β is preferably set larger than the third angle $\theta_{MAX}$, which is the maximum angular difference between the extending direction D1 of the front surface 25 of the first tray 20 and the movement direction E of the second tray 30. In other words, the difference between the first angle and the second angle is preferably 0.01° (inclusive) to 5° (inclusive).

$$\text{Third Angle } \theta_{MAX} < (\text{Second Angle } \beta - \text{First Angle } \alpha) \leq 5°$$

The first angle α and the second angle β are desirably set to 20° (inclusive) to 70° (inclusive), assuming that the first inclined surfaces 22 are not parallel to the second inclined surfaces 32. For example, the first angle α illustrated in FIG. 7 is set to 42°, the second angle β is set to 45°, and the third angle $\theta_{MAX}$ is set to about 2°.

In this embodiment, the second locked portion 23 is formed between the two first inclined surfaces 22, and the second locking portion 33 is formed between the two second inclined surfaces 32. With this arrangement, even when the locking portion 31 crosses the locked portion 21 for any cause, removal of parts of the second tray 30 from the first tray 20 can be prevented by collision of the second locking portion 33 against the second locked portion 23. As illustrated in FIG. 7, the second locked portion 23 is formed with a gap 34 between the second locked portion 23 and the second locking portion 33 while the two second inclined surfaces 32 at least partially abut against the two first inclined surfaces 22, respectively. In other words, since the locking portion 31 is normally locked to the locked portion 21, the second locking portion 33 and the second locked portion 23 have a gap 34 formed between them and therefore do not collide against each other. The second locking portion 33 in this embodiment is located between the two second inclined surfaces 32, and the second locked portion 23 is located between the two first inclined surfaces 22. This is merely an example, and the second locking portion 33 may be located anywhere on the front surface 35 of the second tray 30, assuming that the second locking portion 33 is located more to the rear side than the two second inclined surfaces 32 in the direction to pull out the second tray 30. The second locked portion 23 may be located anywhere on the back surface 26 of the first tray 20, assuming that the second locked portion 23 is located more to the rear side than the two first inclined surfaces 22 in the direction to pull out the second tray 30, in correspondence with the position of the second locking portion 33.

The inventors of the present invention verified the effects of the present invention by fabricating a test piece equipped with a removal prevention mechanism (a locking portion 31 and a locked portion 21) according to the present invention and a test piece equipped with a removal prevention mechanism (see FIG. 1) according to the conventional scheme. The test piece according to the present invention was formed to make the collision surfaces tilted (fabricated to set the angle α formed by the extending direction D1 of the front surface 25 of the first tray 20 and each first inclined surface 22 to about 42°, and the angle β formed by the movement direction E of the second tray 30, i.e., the extending direction D2 of the front surface 35 of the second tray 30 and each second inclined surface 32 to about 45°), while the test piece according to the conventional scheme was formed to make the collision surfaces parallel. The peak frequency (Hz) and the maximum sound pressure (dB) upon collision when the second tray 30 falls to the first tray 20 by its own weight were measured. Table 1 represents the results.

TABLE 1

| Item | Test Piece According to Present Invention | Test Piece According to Conventional Scheme |
| --- | --- | --- |
| Peak Frequency | 4,565 [Hz] | 5,512 [Hz] |
| Maximum Sound Pressure Level | 59 [dB] | 64 [dB] |

The measurement results reveal that the test piece according to the present invention exhibits a maximum sound pressure level lower than that of the test piece according to the conventional scheme by 5 dB. The peak frequency of the test piece according to the present invention generated a sound smaller for the human ear. The peak frequency of the test piece according to the conventional scheme projects more sharply than the peripheral band and therefore generated a collision sound offensive to the ear. It was confirmed by the present experiment that the test piece according to the present invention can reduce collision sound.

Figure 9A:
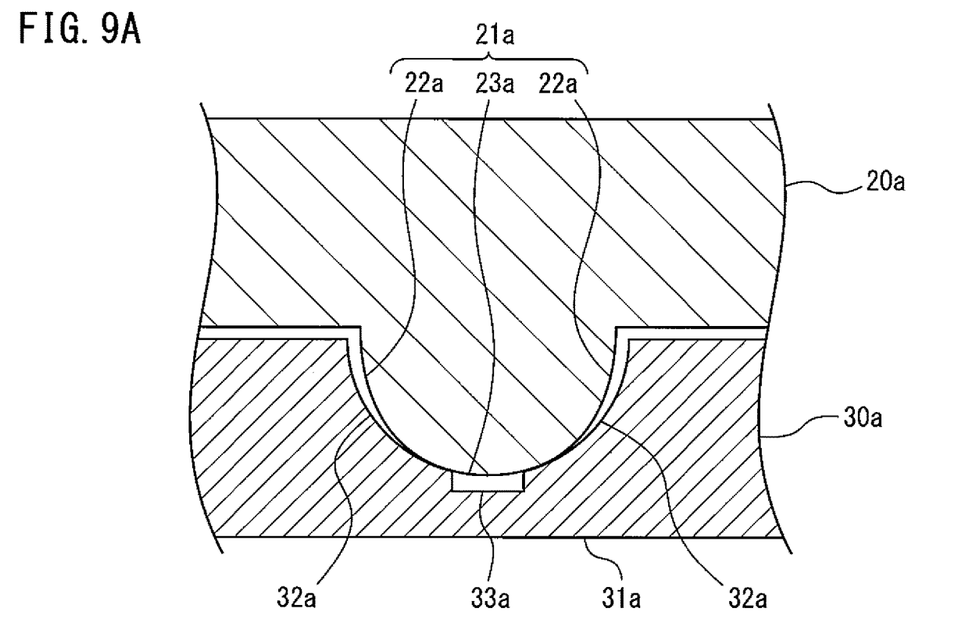
FIG. 9A is a view illustrating another example of the locked portion of the first tray and the locking portion of the second tray.
Figure 9B:
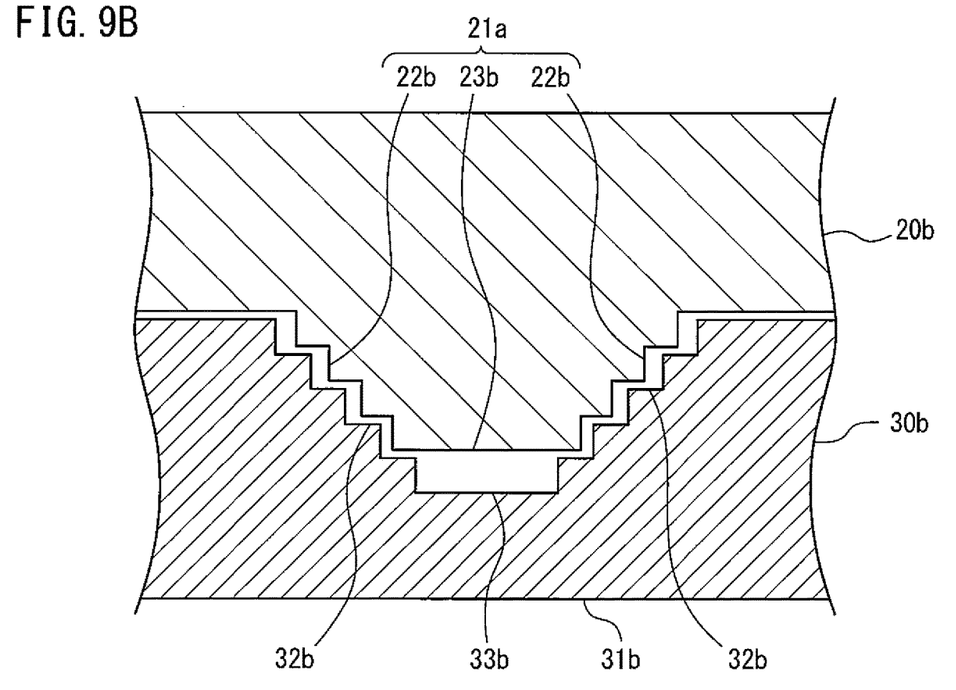
FIG. 9B is a view illustrating another example of the locked portion of the first tray and the locking portion of the second tray.

FIGS. 9A and 9B illustrate another example of the removal prevention mechanism for the tray device according to the present invention. FIG. 9A illustrates the case where first inclined surfaces 22a of a locked portion 21a and second inclined surfaces 32a of a locking portion 31a are shaped in an arc. Note, however, that since shapes formed by the two first inclined surfaces 22a are different from those formed by the two second inclined surfaces 32a, when the locking portion 31a and the locked portion 21a collide against each other, parts of the first inclined surfaces 22a and parts of the second inclined surfaces 32a abut against each other. A second locked portion 23a is formed between the two first inclined surfaces 22a, and a second locking portion 33a is formed between the two second inclined surfaces 32a, as illustrated in FIG. 9A.

FIG. 9B illustrates the case where first inclined surfaces 22b of a locked portion 21b and second inclined surfaces 32b of a locking portion 31b are shaped in a stepped or saw-toothed pattern. The stepped shape formed by the two first inclined surfaces 22b is different from that formed by the two second inclined surfaces 32b. Therefore, when the locking portion 31b and the locked portion 21b collide against each other, the first inclined surfaces 22b and the second inclined surfaces 32b partially abut against each other. A second locked portion 23b is formed between the two first inclined surfaces 22b, and a second locking portion 33b is formed between the two second inclined surfaces 32b, as illustrated in FIG. 9B.

FIGS. 2A to 9B have been referred to in explaining the locked portion 21 and the locking portion 31 that prevent removal when the second tray 30 is moved in the direction to pull it out of the first tray 20 (the direction indicated by the arrow E in any of these drawings). However, a locking portion and a locked portion may be provided to prevent not only removal in the direction to pull out, but also the too much return of the second tray 30 when the second tray 30 is pushed back to the first tray 20 (when it is moved in the direction indicated by the arrow F in FIGS. 2A and 2B). In this case, the width H1 between the two first inclined surfaces 22 and the width H2 between the two second inclined surfaces 32 become larger along the direction to return (the direction indicated by an arrow F in FIG. 2).

The tray device 10 may include a locking portion 31 provided on the first tray 20 and a locked portion 21 provided on the second tray 30, instead of the locked portion 21 provided on the first tray 20 and the locking portion 31 provided on the second tray 30. In this case, the locked portion 21 and the locking portion 31 are provided in directions opposite to those when they are provided on the first tray 20 and the second tray 30, respectively, in the document transport direction, so that the locked portion 21 abuts against the locking portion 31 when the second tray 30 is pulled out of the first tray 20. In this case, the locked portion 21 and the first inclined surface 22 are one exemplary abutting portion and abutting surface, respectively, and the locking portion 31 and the second inclined surface 32 are one exemplary abutted portion and abutted surface, respectively.

The present invention and especially its preferred embodiments have been described above in detail with reference to the drawings.

Provided is a tray device which produces reduced collision sound and prevents removal of parts during tray movement.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A tray device mounted on an apparatus, for holding a document, the device comprising:
   a first tray including a first surface and an abutting portion; and
   a second tray including a second surface and an abutted portion, wherein the second tray is configured to move with respect to the first tray, wherein
   the abutting portion includes two abutting surfaces located obliquely with respect to an extending direction of the first surface in which the first tray is pulled away from the apparatus, and a first angle is formed by each of the two abutting surfaces and the extending direction of the first surface, wherein
   the abutted portion includes two abutted surfaces located obliquely with respect to an extending direction of the second surface in which the second tray is pulled away from the first tray, and a second angle is formed by each of the two abutted surfaces and the extending direction of the second surface, wherein
   the first angle and the second angle do not change when the second tray is being pulled away from the first tray, wherein
   a difference between the first angle and the second angle is set larger than a maximum angular difference between the extending direction of the first surface and a movement direction in which the second tray moves with respect to the first tray, wherein
   the two abutting surfaces are formed on a front surface of the first tray so that a direction in which one surface of the two abutting surfaces is inclined is opposite to a direction in which the other surface of the two abutting surfaces is inclined, wherein
   the two abutted surfaces are formed on a front surface of the second tray so that a direction in which one surface of the two abutted surfaces is inclined is opposite to a direction in which the other surface of the two abutted surfaces is inclined, and wherein the abutting portion abuts against the abutted portion so that the two abutting surfaces are included inside of the two abutted surfaces.

2. The tray device according to claim 1, wherein each of the first tray and the second tray includes one of a projection and a fitting portion which fits with the projection, and when the second tray is moved with respect to the first tray, the second tray is positioned with respect to the first tray by fitting the projection into the fitting portion.

3. The tray device according to claim 1, wherein the first angle and the second angle are within a range of 20° to 70°.

* * * * *